(12) United States Patent
Dong

(10) Patent No.: US 12,323,545 B2
(45) Date of Patent: Jun. 3, 2025

(54) ELECTRONIC DEVICE

(71) Applicant: Honor Device Co., Ltd., Shenzhen (CN)

(72) Inventor: Xiaoyong Dong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/906,312

(22) PCT Filed: Apr. 29, 2022

(86) PCT No.: PCT/CN2022/090797
§ 371 (c)(1),
(2) Date: Sep. 14, 2022

(87) PCT Pub. No.: WO2023/000755
PCT Pub. Date: Jan. 26, 2023

(65) Prior Publication Data
US 2024/0214480 A1 Jun. 27, 2024

(30) Foreign Application Priority Data

Jul. 23, 2021 (CN) .......................... 202110839843.0

(51) Int. Cl.
*H04M 1/02* (2006.01)
(52) U.S. Cl.
CPC ................................ *H04M 1/0283* (2013.01)
(58) Field of Classification Search
CPC .. H04M 1/0283; H04M 1/026; H04M 1/0264; H04M 1/18; H04M 1/0262; H04M 1/02; H04M 1/0249; H04M 1/0277; H04M 1/236; H04M 1/72403; H04M 1/72454; H04M 2250/12; H04M 2250/22; H04M 1/0202; H04M 1/724; H04M 2201/34; H04M 2250/52; H04M 1/0266;
(Continued)

(56) References Cited

U.S. PATENT DOCUMENTS 10,671,119 B2 * 6/2020 Ohtaka ................. G06F 1/1626
2015/0163940 A1 * 6/2015 Scott ..................... G06F 1/1626
361/679.01

(Continued)

FOREIGN PATENT DOCUMENTS

| CN | 205071069 U | 3/2016 |
| CN | 208540011 U | 2/2019 |
| CN | 213186172 U | 5/2021 |

*Primary Examiner* — Quan M Hua
(74) *Attorney, Agent, or Firm* — Slater Matsil, LLP

(57) ABSTRACT

An electronic device includes: a battery cover with a hole, a battery module, a battery protection circuit board and a first functional device. The battery module is arranged on an inner side of the battery cover and including a battery and a battery protection circuit board arranged facing the hole. The decorative member is arranged on the battery cover and including a first decorative portion and a second decorative portion. The battery protection circuit board is projected to form a first orthographic projection. The first decorative portion is projected to form a second orthographic projection. The first functional device is located on a side of the battery protection circuit board facing the first decorative portion and arranged corresponding to the first through hole.

20 Claims, 7 Drawing Sheets

(58) Field of Classification Search
CPC ........ H04N 23/51; H04N 23/50; H04N 23/57; H04N 23/52; H04N 23/54; H04N 23/55; H04N 23/60; H04N 23/611; H04N 23/66
See application file for complete search history.

(56) References Cited

U.S. PATENT DOCUMENTS

2016/0173673 A1* 6/2016 Hyun .................. H04M 1/0277
   455/566
2020/0084310 A1    3/2020 Keen et al.

\* cited by examiner

ELECTRONIC DEVICE

CROSS-REFERENCE TO RELATED APPLICATIONS

This application is a National Stage of International Application No. PCT/CN2022/090797, filed on Apr. 29, 2022, which claims priority to Chinese Patent Application No. 202110839843.0, filed on Jul. 23, 2021. Both of the aforementioned applications are hereby incorporated by reference in their entireties.

TECHNICAL FIELD

Embodiments of this application relate to the technical field of terminals, and in particular, to an electronic device.

BACKGROUND

With development of science and technology, an electronic device such as a smart phone or a tablet computer (portable equipment, PAD) gradually becomes a device for daily use of people, and has increasing functions. For example, increasing types of rear functional devices are mounted in the electronic device. The functional devices may be configured for photographing, light sensing, illumination, or the like. Since there is a special demand for miniaturization and lightening and thinning of the electronic device, but the functional devices are relatively large, a decorative member is used to shield or hide the functional devices. In this way, not only corresponding functions can be realized by using the functional devices, but also a pleasing appearance of the electronic device is realized. Since an internal space of the electronic device is relatively small, factors such as a capacity of a battery and a position and a size of a main board are required to be considered when many functional devices are required to be arranged. Therefore, how to enlarge the decorative member so as to accommodate more functional devices and realize a proper layout of the devices without affecting the battery capacity becomes a problem to electronic devices.

SUMMARY

Embodiments of this application provide an electronic device, to enlarge a decorative member so as to accommodate more functional devices and realize a proper layout of the devices without affecting a battery capacity.

A first aspect of this application provides an electronic device. The electronic device includes at least:
 a battery cover, having a hole;
 a battery module, arranged on an inner side of the battery cover and including a battery and a battery protection circuit board connected to the battery, where the battery protection circuit board is arranged facing the hole, and along a thickness direction of the battery cover, the battery protection circuit board is projected to form a first orthographic projection;
 a decorative member, arranged on the battery cover and including a first decorative portion and a second decorative portion, where along the thickness direction of the battery cover, the first decorative portion is projected to form a second orthographic projection, the first orthographic projection and the second orthographic projection at least partially overlap, the first decorative portion has a first through hole that is in communication with the hole, the second decorative portion is located on a side of the battery protection circuit board away from the battery, and the second decorative portion has a second through hole that is in communication with the hole; and
 a first functional device, located on a side of the battery protection circuit board facing the first decorative portion and arranged corresponding to the first through hole, where along the thickness direction, the first functional device is projected to form a third orthographic projection, and the first orthographic projection and the third orthographic projection at least partially overlap.

In the electronic device provided in this embodiment of this application, since the first functional device is arranged on the side of the battery protection circuit board facing the battery cover, a space between the battery protection circuit board and the decorative member is used. The functional device may be arranged in both a region corresponding to the main board and a region corresponding to the battery protection circuit board. In this way, a density of the functional devices arranged in the region corresponding to the main board can be reduced when a quantity of the functional device increases, and a proper layout of the battery module, the functional device, and the main board is realized. Therefore, by using the electronic device in this embodiment of this application, a decorative member can be enlarged so as to accommodate more functional devices and a proper layout of the devices can be realized without affecting a battery capacity.

In a possible implementation, an edge of the first orthographic projection close to the battery and an edge of the third orthographic projection close to the battery have a coincident region; or an edge of the first orthographic projection close to the battery is tangent to an edge of the third orthographic projection close to the battery; or the third orthographic projection is located within the first orthographic projection.

In a possible implementation, along the thickness direction, a height difference exists between a surface of the battery facing the battery cover and a surface of the battery protection circuit board facing the battery cover, so that an accommodating space is formed on a side of the battery protection circuit board facing the battery cover, and at least part of the first functional device is accommodated in the accommodating space.

In a possible implementation, the decorative member is arranged on an outer side of the battery cover facing away from the battery module.

In a possible implementation, a surface of the battery cover facing the decorative member has a groove, the groove extends along a circumferential direction of the hole, the electronic device further includes a sealing member arranged in the groove, and the sealing member is configured to seal the battery cover and the decorative member.

In a possible implementation, the electronic device further includes a hot-melt connector, where the decorative member is connected to the battery cover by the hot-melt connector.

In a possible implementation, along a height direction of the battery cover, the battery is located outside a region defined by the hole, and along the thickness direction, the battery is projected to form a fourth orthographic projection, the second orthographic projection and the fourth orthographic projection partially overlap, and the thickness direction is perpendicular to the height direction.

In a possible implementation, the electronic device further includes a main board and an adapter circuit board, where the main board is arranged on a side of the battery protection circuit board facing away from the battery, and along the thickness direction, the second decorative portion is arranged corresponding to the main board, the adapter circuit board is connected to the first functional device and the main board, the adapter circuit board has an extension, the extension is located between the battery protection circuit board and the first decorative portion, and the first functional device is connected to the extension.

In a possible implementation, along the height direction of the battery cover, a first gap exists between the main board and the battery protection circuit board, and the thickness direction is perpendicular to the height direction.

In a possible implementation, the electronic device further includes a bracket, where the bracket is located on an inner side of the battery cover, the main board is connected to the bracket, the bracket includes a support portion, the support portion is located between the battery protection circuit board and the first decorative portion, and the first functional device is connected to the support portion, or the first functional device and the extension are both connected to the support portion.

In a possible implementation, the first functional device is arranged on a side of the support portion facing the battery cover, or the first functional device and the extension are both arranged on a side of the support portion facing the battery cover.

In a possible implementation, along the thickness direction, a second gap exists between the support portion and the battery protection circuit board.

In a possible implementation, along the height direction of the battery cover, a third gap exists between the support portion and the battery, and the thickness direction is perpendicular to the height direction.

In a possible implementation, the electronic device further includes a second functional device, where the second functional device is located on a side of the main board facing the second decorative portion, and is arranged corresponding to the second through hole.

In a possible implementation, a part of the first functional device is located in the first through hole and is in clearance fit with the first through hole.

In a possible implementation, the first functional device is a camera module, a flash, a time-of-flight sensor, a light sensor, a microphone, or a display.

REFERENCE NUMERALS

1. Electronic device;
2. Battery cover; 21. Hole; 22. Groove; 23. Connecting hole;
3. Decorative member; 3a. First through hole; 3b. Second through hole; 31. First decorative portion; 32. Second decorative portion;
4. Middle frame;
5. Main board;
6. Electronic element;
7. Battery module; 71. Battery; 72. Battery protection circuit board;
8. Display assembly;
9. First functional device;
10. Second functional device;
11. Adapter circuit board; 111. Extension;
12. Bracket; 121. Support portion;
13. Sealing member;
14. Hot-melt connector;
99. Accommodating space;
H1. First gap;
H2. Second gap;
H3. Third gap;
100. First orthographic projection;
200. Second orthographic projection;
300. Third orthographic projection;
400. Fourth orthographic projection;
Y. Height direction; and
Z. Thickness direction.

DETAILED DESCRIPTION OF ILLUSTRATIVE EMBODIMENTS

An electronic device 1 in embodiments of this application may be referred to as user equipment (user equipment, UE), a terminal (terminal), or the like. For example, the electronic device 1 may be a mobile terminal or a stationary terminal having a display, such as a tablet computer (portable android device, PAD), a personal digital assistant (PDA), a notebook computer, a handheld device having a wireless communication function, a computing device, an on-board device, a wearable device, a virtual reality (virtual reality, VR) terminal device, an augmented reality (AR) terminal device, a wireless terminal in industrial control (industrial control), a wireless terminal in self driving (self driving), a wireless terminal in remote medical (remote medical), a wireless terminal in smart grid (smart grid), a wireless terminal in transportation safety (transportation safety), a wireless terminal in smart city (smart city), or a wireless terminal in smart home (smart home). A form of the terminal device is not specifically limited in the embodiments of this application.

Figure 1:
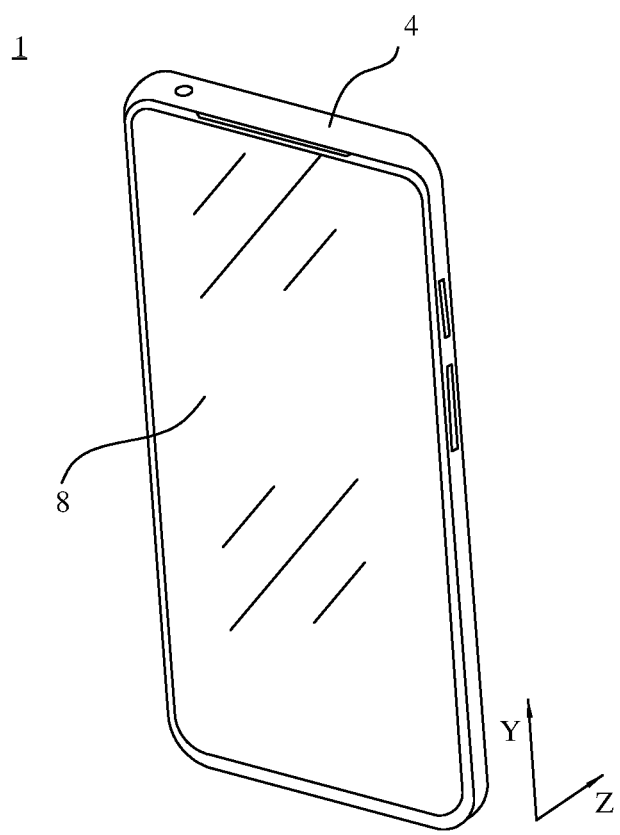
FIG. 1 is a schematic structural diagram of an electronic device according to an embodiment of this application.

FIG. 1 schematically shows a structure of an electronic device 1 according to an embodiment. Referring to FIG. 1, in this embodiment of this application, the electronic device 1 is a handheld device having a wireless communication function, for example. The handheld device having a wireless communication function may be, for example, a mobile phone.

Figure 2:
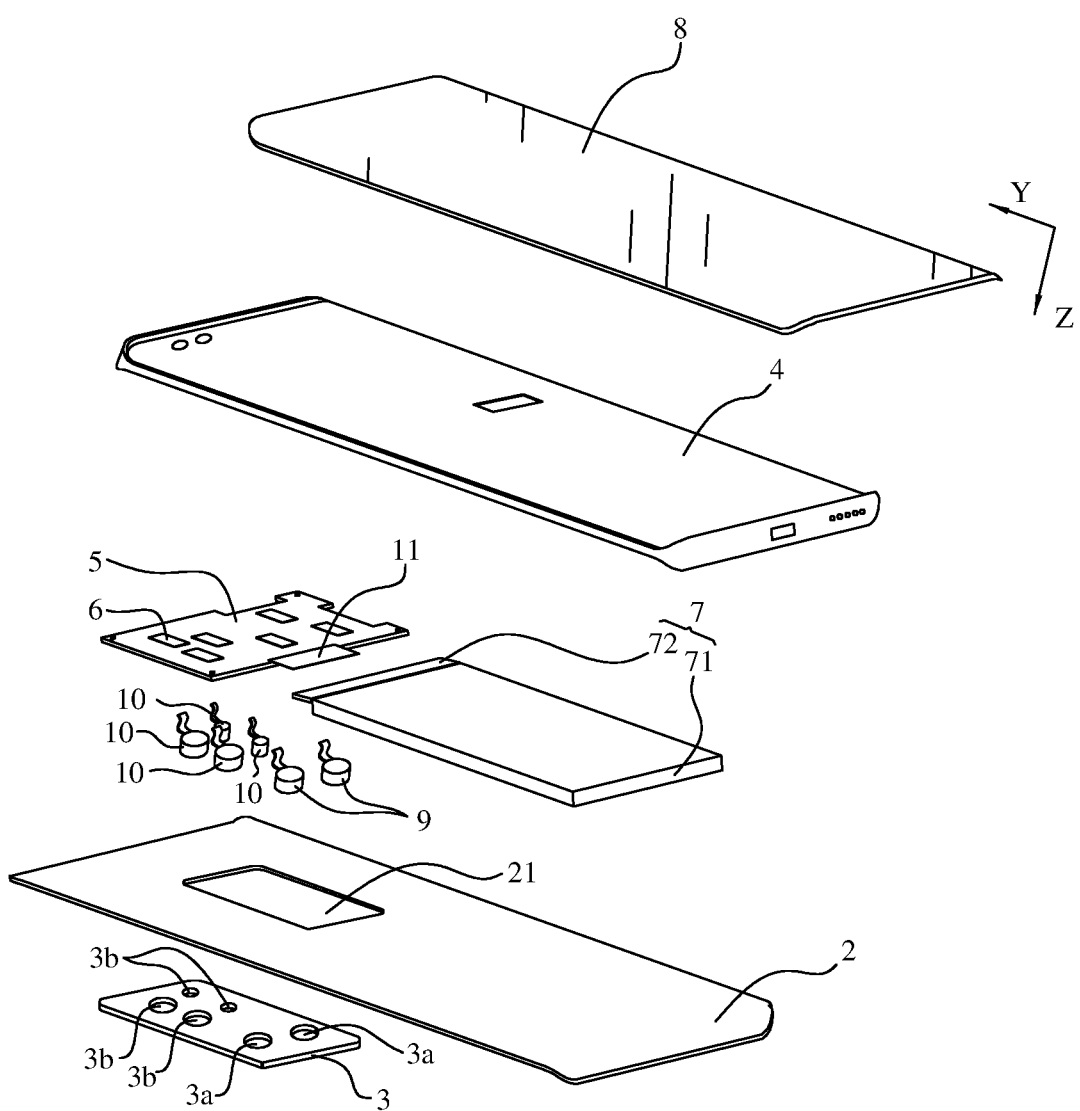
FIG. 2 is a partial schematic structural exploded view of the electronic device according to an embodiment of this application.

FIG. 2 schematically shows a partial exploded structure of the electronic device 1 according to an embodiment. Referring to FIG. 1 and FIG. 2, the electronic device 1 in this embodiment of this application includes a battery cover 2, a decorative member 3, a middle frame 4, a main board 5, a battery module 7, and a display assembly 8. The display assembly 8 is mounted to the middle frame 4, and a display region of the display assembly 8 is exposed to present image information to a user. The main board 5 and the battery module 7 are arranged on inner sides of the electronic device 1 and are located inside the battery cover 2 and the display assembly 8, so that a user is unlikely to observe the main board 5 and the battery module 7 outside the electronic device 1. A plurality of types of electronic elements 6 are arranged on the main board 5. The electronic element 6 includes but are not limited to a processor, an antenna module, a Bluetooth module, a Wi-Fi module, a GPS module, a power supply and a charging module, a screen display and operating module, a distance sensor, a light sensor, an earphone jack, and a USB interface. Since an internal space of the electronic device 1 is relatively small, the electronic elements 6 are highly integrated on the main board 5 to minimize a volume of the main board 5 and reduce a space occupancy of the main board 5. Optionally, in order to meet design requirements for the internal space of the electronic device 1, the main board 5 may have separate pieces. Different electrical elements are arranged on the main board 5 having separate pieces to realize corresponding functions.

After the electronic elements 6 are highly integrated, heat generated by the electronic element 6 easily accumulates in a space, resulting in a temperature increase in the electronic elements 6 and affecting operation performance of the electronic elements 6. For example, in a scenario where a user uses the electronic device 1 to play a game, play a video, or make a call for a long time, the electronic elements 6 of the electronic device 1 generate a large amount of heat due to continuous operation for a long time and form a heat source. The user can obviously feel a temperature rise of the electronic device 1 from the outside of the electronic device 1. Therefore, the heat is required to be dissipated from the inside of the electronic device 1 to the outside of the electronic device 1 in time, to cause an ambient temperature at a position of the electronic elements 6 to be within a normal operation temperature range, thereby ensuring stable operation of the electronic element 6.

The battery module 7 is configured to provide electrical energy to the electronic device 1 to ensure normal operation of the electronic device 1. For example, the battery module 7 may provide electrical energy to the display assembly 8, so that the display assembly 8 can display image information or complete corresponding operation instructions. Alternatively, the battery module 7 may provide electrical energy to the main board 5, to ensure that the electronic element 6 on the main board 5 operates normally. The battery module 7 includes a battery 71 and a battery protection circuit board 72. The battery 71 may be a lithium ion battery, such as a lithium iron phosphate battery. The battery 71 is a structural member that can convert chemical energy to electrical energy. The battery 71 includes a positive tab and a negative tab having opposite polarities. Along a height direction Y of the battery cover 2, the battery protection circuit board 72 is arranged on a side of the battery 71. The battery protection circuit board 72 is a plate-like structure having a predetermined thickness. The battery protection circuit board 72 is configured to detect an operating status of the battery 71, to reduce a possibility of overcharge, overdischarge, a short circuit, or ultra-high temperature charging and discharging of the battery 71, thereby protecting the battery 71. The battery protection circuit board 72 includes a protection circuit. The positive tab and the negative tab of the battery 71 may be welded to the protection circuit, so as to realize an electrical connection between the battery 71 and the battery protection circuit board 72.

Since the electronic device 1 is one of frequently-used products in daily life, the users' demand for lightening and thinning or miniaturization of the electronic device 1 is increasing. The lightened and thinned or miniaturized electronic device 1 can effectively reduce fatigue during use of the electronic device 1 and difficulty in carrying the electronic device for users. In addition, users have increasing demands on functions of the electronic device 1. For example, the electronic device 1 may include functional devices configured for photographing, light sensing, or illumination, so that the electronic device 1 can realize various functions. For example, the functional devices are camera modules configured for photographing. In order to obtain more desirable imaging quality, the camera module is required to be designed to be larger to arrange an optical lens set or optical sensor with more desirable performance. However, a relatively large camera module imposes a limitation on a thickness of the electronic device 1. In order to realize lightening and thinning or miniaturization of the electronic device 1 and obtain desirable image quality, the decorative member 3 is required to be arranged on the battery cover 2 of the electronic device 1 to shield or mask the functional devices. Therefore, not only a corresponding function is realized by using the functional device, but also a pleasing appearance of the electronic device 1 is realized. Moreover, a thickness of a part other than the functional devices may be designed to be less, thereby realizing lightening and thinning or miniaturization of the electronic device 1. The decorative member 3 is arranged on the battery cover 2 and may be connected to the battery cover 2. Since a part of the decorative member 3 is higher than an outer surface of the battery cover 2, a thickness of a region on the electronic device 1 where the decorative member 3 is arranged is overall relatively large. The outer surface of the battery cover 2 is a surface facing an external environment. Users can observe or touch the outer surface of the battery cover 2 when using the electronic device 1.

With diverse function demands for the electronic device 1, increasing types of functional devices are required. A size of the decorative member 3, a proper layout of the devices, and a capacity of the battery 71 limit and affect each other. For example, with ensuring a proper layout of the devices, if the size of the decorative member 3 is increased, a size of the battery 71 is reduced, resulting in a decrease in the capacity of the battery 71. Since the internal space of the electronic device 1 is relatively small, factors such as a capacity of the battery 71 and a position and a size of the main board 5 are required to be considered when many functional devices are required to be arranged.

In addition, the functional devices dissipate heat during an operation. Since the functional devices are collectively arranged on the region corresponding to the main board 5, the functional devices occupy more space formed between the main board 5 and the battery cover 2. On the one hand, since the functional devices occupy more space, a heat dissipation channel of the main board 5 is occupied, causing an adverse effect on heat dissipation efficiency of the main board 5. On the other hand, since the functional devices dissipate heat, an adverse effect is caused to heat dissipation of the main board 5. If the heat of the main board 5 cannot be dissipated in time, the heat accumulates in the region of the main board 5, and the main board 5 is in a high temperature operation environment. As a result, operation stability of the main board 5 degrades, affecting overall operation stability of the electronic device 1.

In the electronic device 1 in this embodiment of this application, a space between the battery protection circuit board 72 and the decorative member 3 is used, so that the functional devices can be arranged in a region other than the main board 5. In this way, the size of the decorative member 3 can be increased to accommodate more functional devices, and a proper layout of the devices can be realized without affecting the capacity of the battery 71.

In the electronic device 1 in this embodiment of this application, the functional devices may be arranged separately to reduce a density of the functional devices in the corresponding region of the main board 5, thereby reducing a possibility that the functional devices adversely affect the heat dissipation process of the main board 5. In this way, effective heat dissipation of the main board 5 is ensured in the trend of increasing functional devices.

The implementation of the electronic device 1 provided in this embodiment of this application is described below.

An embodiment of this application provides an electronic device 1, which includes at least a battery cover 2, a battery module 7, a decorative member 3, and a first functional device 9.

The battery cover 2 has a predetermined thickness. The battery cover 2 may be connected to the middle frame 4. For example, the battery cover 2 may be connected to the middle frame 4 by a fastener or an adhesive member. Four edges of the battery cover 2 all may be connected to the middle frame 4. A hole 21 is provided on the battery cover 2. The hole 21 is configured to avoid the first functional device 9. The hole 21 may be formed on the battery cover 2 by punching, cutting, or drilling. A shape of the hole 21 may be, but is not limited to, a rectangle, a circle, an ellipse, or a polygon having more than four sides. A size of the hole 21 is required to enable the hole to avoid all functional devices. The battery cover 2 has an outer surface and an inner surface opposite to each other in a thickness direction Z of the battery cover. It should be noted that the outer surface of the battery cover 2 is a surface that is located on the outside the electronic device 1 and can be observed outside the electronic device 1. The inner surface of the battery cover 2 is a surface that is located inside the electronic device 1 and is not easily observed outside the electronic device 1. The thickness direction Z of the battery cover 2 is a direction from the inner surface to the outer surface, the hole 21 extends through the outer surface and the inner surface of the battery cover 2 along the thickness direction Z of the battery cover 2. One hole 21 may be provided. The battery cover 2 may be an integral structure formed by stamping a metal plate. Alternatively, the battery cover 2 may be a structural member including two materials. For example, a piece of glass is arranged on the metal plate. The battery cover 2 may be configured as a back cover of the electronic device 1.

The battery module 7 is arranged on an inner side of the battery cover 2. The battery cover 2 can form protection for the battery module 7, thereby reducing a possibility that an external object collides with or punctures the battery module 7 and causes structural damage or fire and explosion to the battery module 7. Part of heat generated by the battery module 7 during supplying of electrical energy may be conducted by the battery cover 2 and dissipated to the outside of the electronic device 1. The battery module 7 may be arranged on the inner surface of the battery cover 2 and connected to the battery cover 2. Alternatively, the battery module 7 may be connected to the middle frame 4 and abut against the inner surface of the battery cover 2. The battery protection circuit board 72 is arranged in a manner of facing the hole 21 of the battery cover 2. At least part of the battery protection circuit board 72 is arranged corresponding to the hole 21 of the battery cover 2. Along the thickness direction Z of the battery cover 2, the battery protection circuit board 72 can be observed outside the electronic device 1 through the hole 21. Exemplarily, the thickness direction Z of the battery cover 2 may alternatively mean that the thickness direction Z of the battery cover 2 is perpendicular to a horizontal surface when the electronic device 1 is placed on the horizontal surface and the battery cover 2 is in contact with the horizontal surface.

Figure 3:
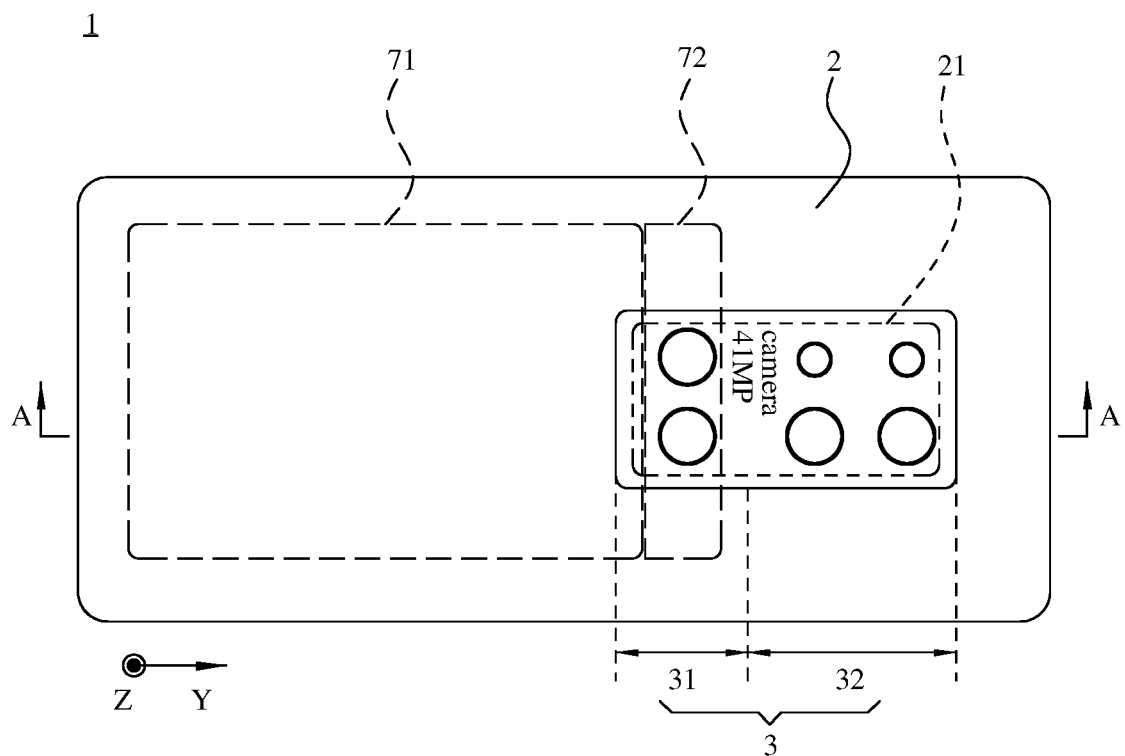
FIG. 3 is a schematic diagram of a back structure of the electronic device according to an embodiment of this application.
Figure 4:
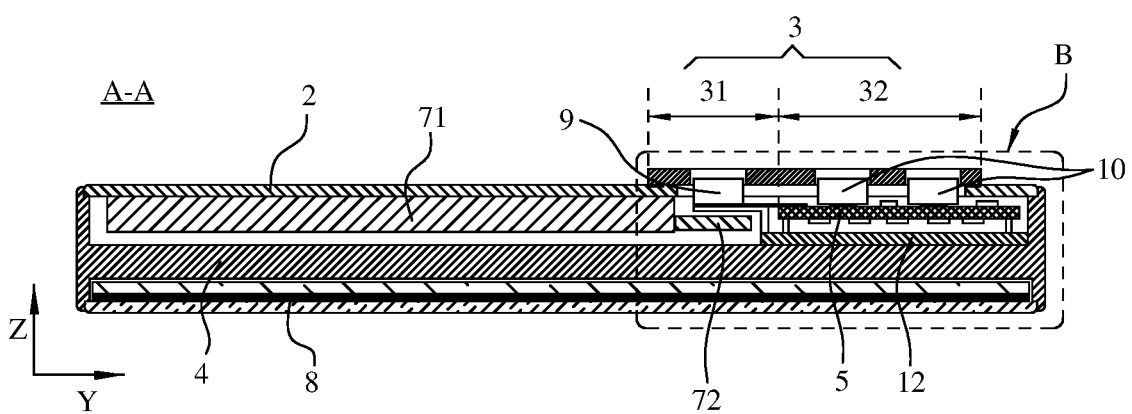
FIG. 4 is a schematic structural cross-sectional view of FIG. 3 along a direction A-A.

FIG. 3 schematically shows a back structure of an electronic device according to an embodiment of this application. Referring to FIG. 3 and FIG. 4, the decorative member 3 is arranged on the battery cover 2. The decorative member 3 is arranged corresponding to the hole 21 of the battery cover 2. The decorative member 3 includes a first decorative portion 31 and a second decorative portion 32. Exemplarily, the decorative member 3 is an integral structure. The first decorative portion 31 and the second decorative portion 32 are distributed in sequence and connected to each other. Along the height direction Y of the battery cover 2, a part of the decorative member 3 beyond an edge of the main board 5 close to the battery 71 forms the first decorative portion 31.

Figure 5:
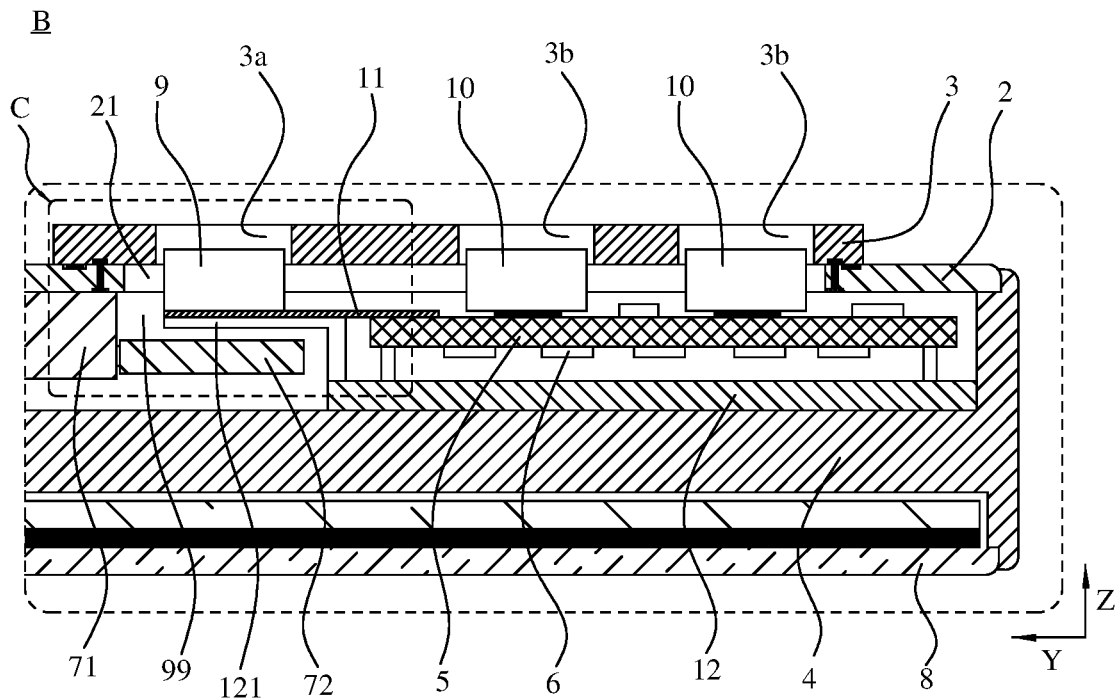
FIG. 5 is a schematic enlarged view of B in FIG. 4.
Figure 6:
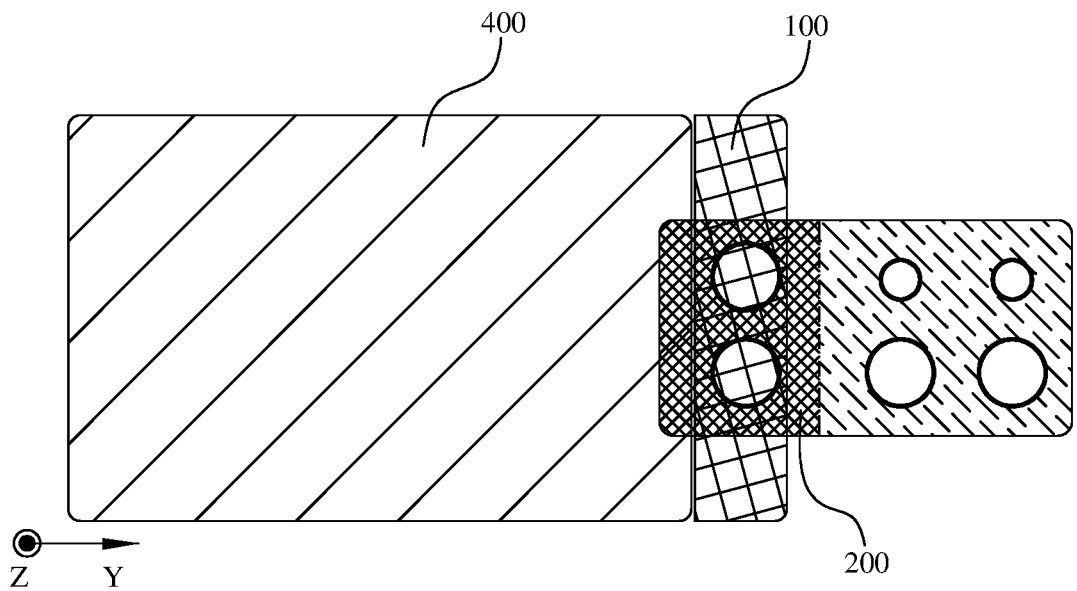
FIG. 6 is a schematic diagram of a positional relationship among a first orthographic projection, a second orthographic projection, and a fourth orthographic projection according to an embodiment of this application.

Referring to FIG. 4 to FIG. 6, along the thickness direction Z of the battery cover 2, the battery protection circuit board 72 is projected to form a first orthographic projection 100. Exemplarily, the orthographic projection is a shadow formed by an object on a flat surface when light perpendicular to the flat surface irradiates the object located in front of the flat surface. Along the thickness direction Z of the battery cover 2, the first decorative portion 31 is projected to form a second orthographic projection 200. The first orthographic projection 100 formed by the battery protection circuit board 72 and the second orthographic projection 200 formed by the first decorative portion 31 at least partially overlap. It should be noted that the expression "the first orthographic projection 100 and the second orthographic projection 200 at least partially overlap" includes two implementations that the first orthographic projection 100 and the second orthographic projection 200 partially overlap and that the first orthographic projection 100 and the second orthographic projection 200 completely overlap. Referring to FIG. 5, when the first orthographic projection 100 and the second orthographic projection 200 partially overlap, the first orthographic projection 100 and the second orthographic projection 200 have an intersection region. When the first orthographic projection 100 and the second orthographic projection 200 completely overlap, the second orthographic projection 200 is located within the first orthographic projection 100, or the second orthographic projection 200 coincides with the first orthographic projection 100.

Along the thickness direction Z of the battery cover 2, the first decorative portion 31 is located on a side of the battery protection circuit board 72. The first decorative portion 31 has a first through hole 3a that is in communication with the hole 21 of the battery cover 2. The first through hole 3a is located in a region defined by the hole 21 of the battery cover 2. The first through hole 3a is configured to transmit light or sound, so that light or sound can reach the first functional device 9 and be received by the first functional device 9. Alternatively, the first through hole 3a is configured to avoid the first functional device 9, so that a part of the first functional device 9 can be inserted into the first through hole 3a. The first functional device 9 can be observed through the first through hole 3a. The second decorative portion 32 is located on a side of the battery protection circuit board 72 away from the battery 71. An orthographic projection of the second decorative portion 32 along the thickness direction Z of the battery cover 2 does not intersect with the first orthographic projection 100 formed by the battery protection circuit board 72. That is to say, the orthographic projection of the second decorative portion 32 along the thickness direction Z of the battery cover 2 is located outside the first orthographic projection 100 formed by the battery protection circuit board 72. The second decorative portion 32 has a second through hole 3b that is in communication with the hole 21 of the battery cover 2. The second through hole 3b is located in the region defined by the hole 21 of the battery cover 2. The electronic device 1 further includes a second functional device 10. The second through hole 3b is configured to transmit light or sound, so that light or sound can reach the second functional device 10 and be received by the second functional device 10. Alternatively, the second through hole 3b is configured to avoid the second functional device 10, so that a part of the second functional device 10 can be inserted into the second through hole 3b. The second functional device 10 can be observed through the second through hole 3b. Exemplarily, functions of the first functional device 9 and the second functional device 10 may be the same or different. Exemplarily, the first functional device 9 may be a camera module, a flash, a time of flight (Time of Flight, TOF) sensor, a light sensor, a microphone, or a display. The TOF sensor is a sensor that can emit modulated near-infrared light and calculate a time difference or a phase difference between emission and reflection of the light after the light is reflected by a to-be-photographed object, to calculate a distance from the to-be-photographed object so as to generate depth information. The second functional device 10 may be a camera module, a flash, a time-of-flight sensor, a light sensor, a microphone, or a display.

Figure 7:
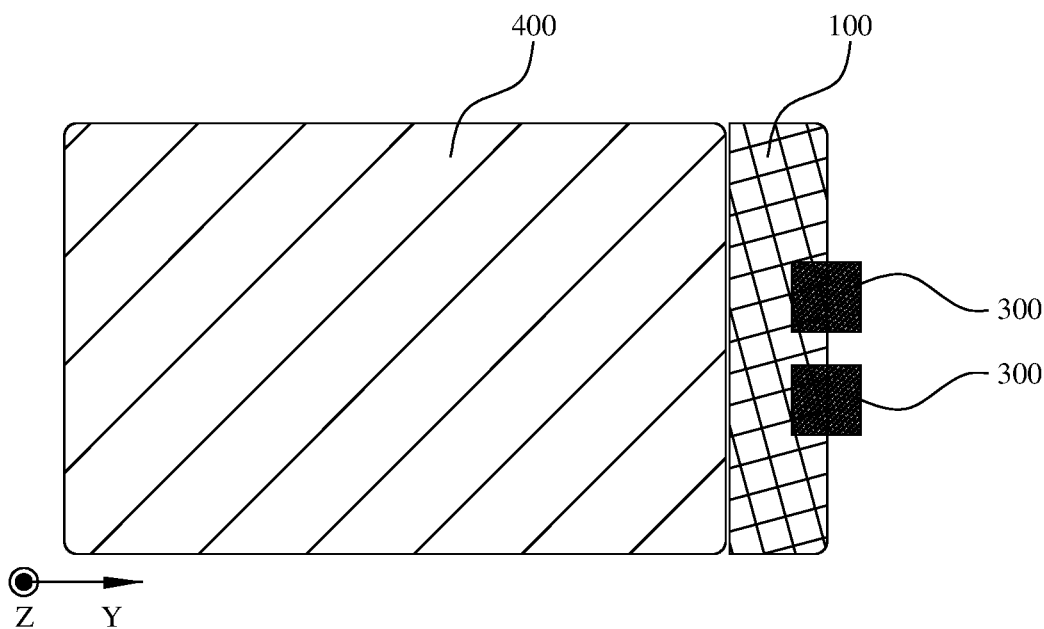
FIG. 7 is a schematic diagram of a positional relationship among the first orthographic projection, a third orthographic projection, and the fourth orthographic projection according to an embodiment of this application.
Figure 8:
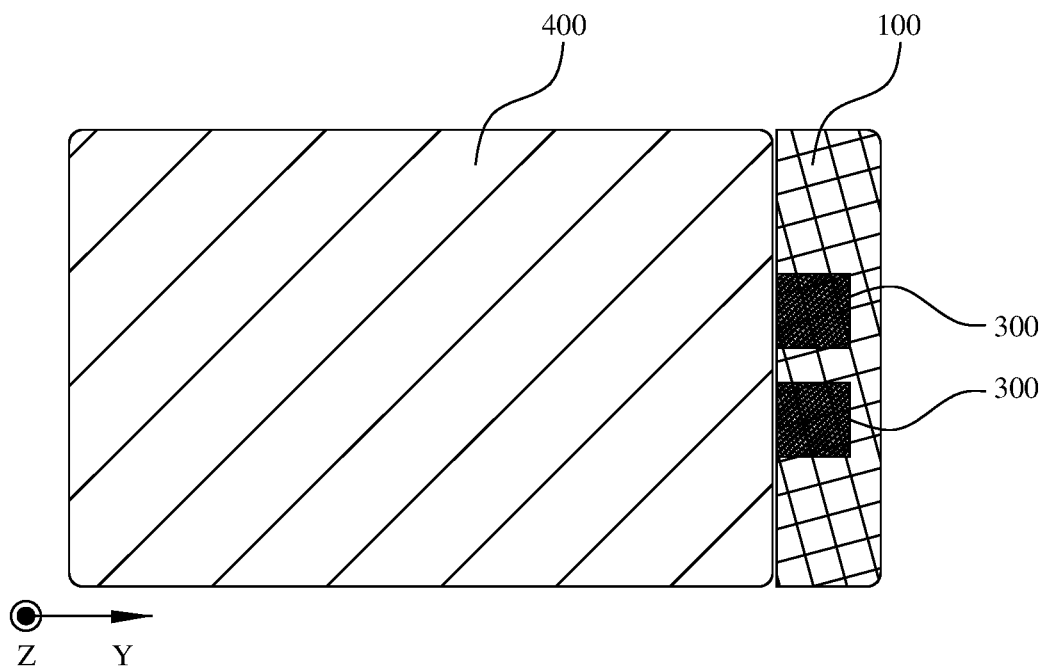
FIG. 8 is a schematic diagram of a positional relationship among the first orthographic projection, the third orthographic projection, and the fourth orthographic projection according to another embodiment of this application.

Along the thickness direction Z of the battery cover 2, the first functional device 9 is located on a side of the battery protection circuit board 72 facing the first decorative portion 31. The first functional device 9 is arranged corresponding to the first through hole 3a. Referring to FIG. 7, along the thickness direction Z of the battery cover 2, the first functional device 9 is projected to form a third orthographic projection 300. The first orthographic projection 100 formed by the battery protection circuit board 72 and the third orthographic projection 300 formed by the first functional device 9 at least partially overlap. It should be noted that the expression "the first orthographic projection 100 and the third orthographic projection 300 at least partially overlap" includes two implementations that the first orthographic projection 100 and the third orthographic projection 300 partially overlap and that the first orthographic projection 100 and the third orthographic projection 300 completely overlap. Referring to FIG. 7, when the first orthographic projection 100 and the third orthographic projection 300 partially overlap, the first orthographic projection 100 and the third orthographic projection 300 have an intersection region. When the first orthographic projection 100 and the third orthographic projection 300 completely overlap, the third orthographic projection 300 is located within the first orthographic projection 100 (as shown in FIG. 8), or the first orthographic projection 100 coincides with the third orthographic projection 300. The first functional device 9 may utilize a space between the battery protection circuit board 72 and the battery cover 2, thereby improving a utilization of the internal space of the electronic device 1.

In the electronic device 1 provided in this embodiment of this application, since the first functional device 9 is arranged on a side of the battery protection circuit board 72 facing the battery cover 2, the space between the battery protection circuit board 72 and the decorative member 3 is used. The functional device may be arranged in both a region corresponding to the main board 5 and a region corresponding to the battery protection circuit board 72. In this way, a density of the functional devices arranged in the region corresponding to the main board 5 can be reduced when a quantity of the functional device increases, and a proper layout of the battery module 7, the functional device, and the main board 5 is realized. Since the first functional device 9 utilizes the space corresponding to the battery protection circuit board 72, the first functional device 9 does not interfere with the battery 71 and thus does not affect a layout of the battery 71. In a case that neither the size of the battery 71 nor the capacity of the battery 71 is required to be reduced, the size of the decorative member 3 may be increased, and the first functional device 9 is arranged in a region added to the decorative member 3. Therefore, the density of the functional devices arranged in the region corresponding to the main board 5 is reduced, and a desirable battery life of the battery 71 is ensured.

Figure 9:
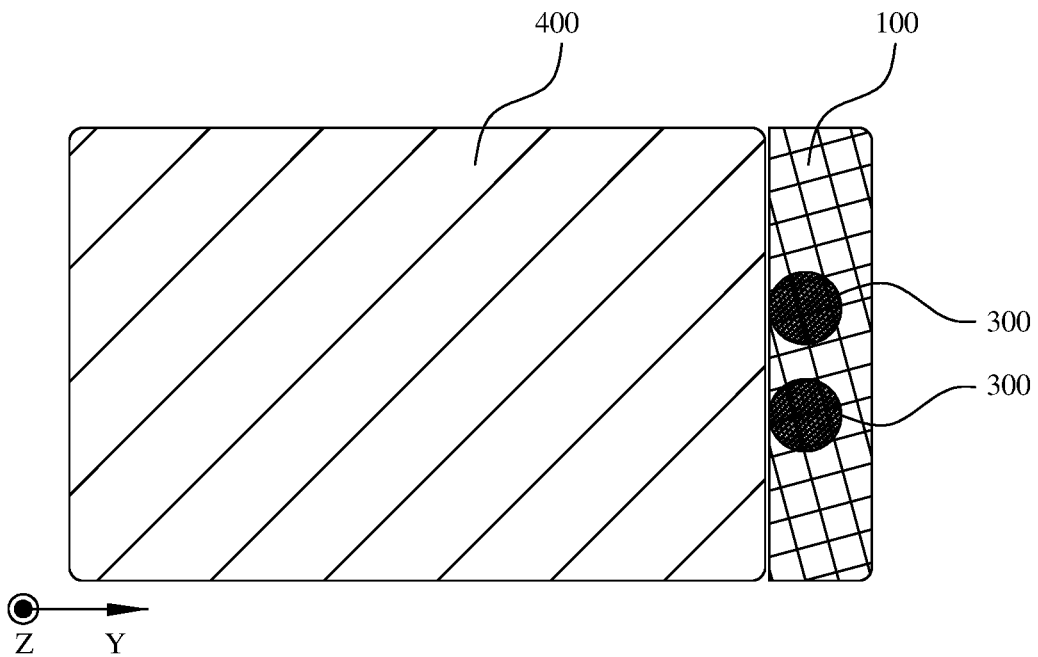
FIG. 9 is a schematic diagram of a positional relationship among the first orthographic projection, the third orthographic projection, and the fourth orthographic projection according to still another embodiment of this application.

In a possible implementation, referring to FIG. 8, an edge of the first orthographic projection 100 formed by the battery protection circuit board 72 close to the battery 71 and an edge of the third orthographic projection 300 formed by the first functional device 9 close to the battery 71 have a coincident region. Exemplarily, the edge of the first orthographic projection 100 close to the battery 71 is a straight line segment, and the edge of the third orthographic projection 300 close to the battery 71 is a straight line segment that coincides with the edge of the first orthographic projection 100 close to the battery 71. In another possible implementation, referring to FIG. 9, the edge of the first orthographic projection 100 formed by the battery protection circuit board 72 close to the battery 71 is tangent to the edge of the third orthographic projection 300 formed by the first functional device 9 close to the battery 71. That is to say, the edge of the first orthographic projection 100 formed by the battery protection circuit board 72 close to the battery 71 and the edge of the third orthographic projection 300 formed by the first functional device 9 close to the edge of the battery 71 have an intersection point. Exemplarily, referring to FIG. 9, the edge of the first orthographic projection 100 close to the battery 71 is a straight line segment, and the edge of the third orthographic projection 300 close to the battery 71 is an arc segment tangent to the edge of the first orthographic projection 100 close to the battery 71. Therefore, the first functional device 9 does not exceed the battery protection circuit board 72 and occupies the space for mounting the battery 71. In this way, the size of the decorative member 3 can be increased without affecting the capacity of the battery 71, and the space corresponding to the battery protection circuit board 72 can be effectively used, thereby further improving the space utilization of the electronic device 1.

Figure 10:
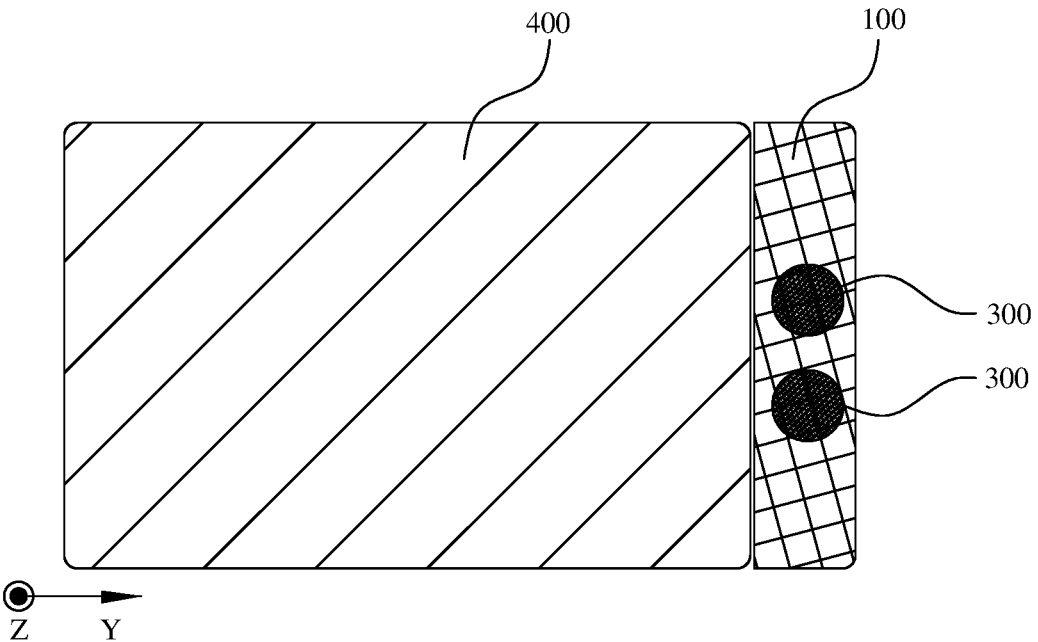
FIG. 10 is a schematic diagram of a positional relationship among the first orthographic projection, the third orthographic projection, and the fourth orthographic projection according to yet another embodiment of this application.

In another possible implementation, referring to FIG. 10, the third orthographic projection 300 formed by the first functional device 9 is located within the first orthographic projection 100 formed by the battery protection circuit board 72. The edge of the first orthographic projection 100 formed by the battery protection circuit board 72 and the edge of the third orthographic projection 300 formed by the first functional device 9 have no intersection point. Therefore, along the height direction Y of the battery cover 2, a buffer gap may be formed between the first functional device 9 and the battery 71, so that a possibility that the first functional device 9 comes into contact with the battery 71 and thus squeezes the battery 71 and thus causes deformation or structural damage to the battery 71 is reduced, thereby improving safety during use of the battery 71.

Figure 11:
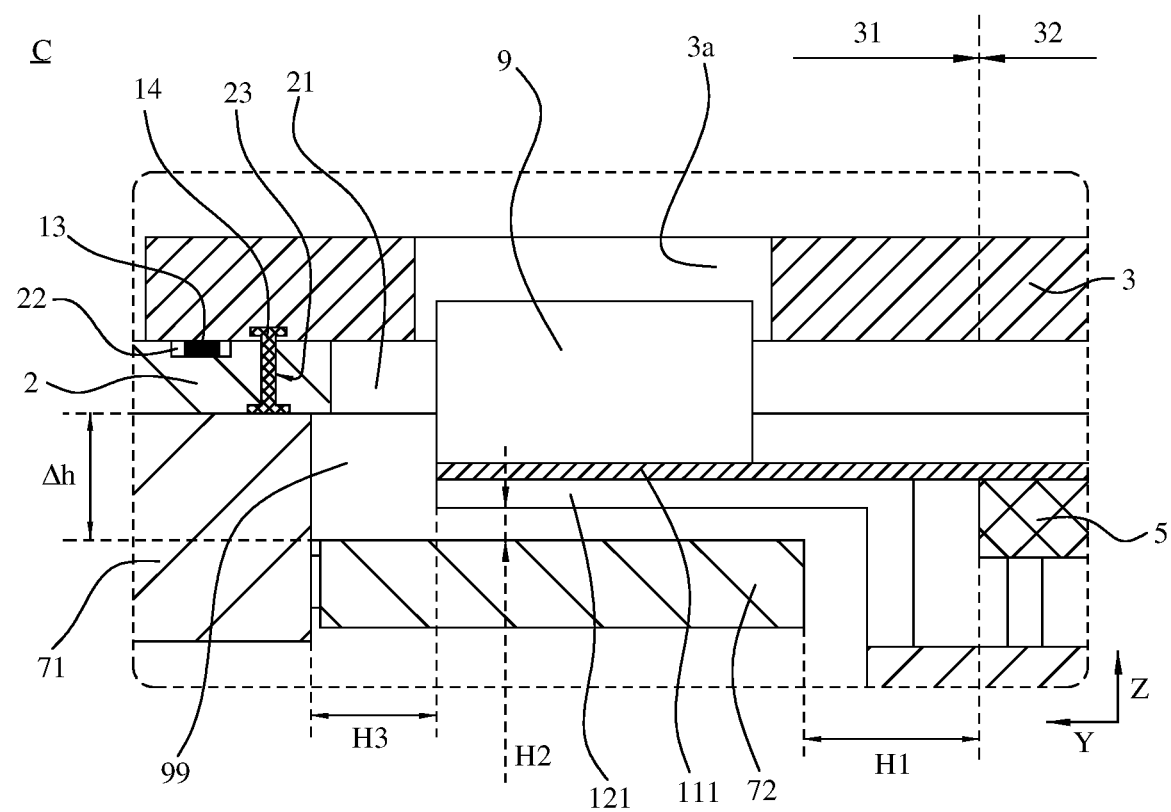
FIG. 11 is a schematic enlarged view of C in FIG. 5.

Referring to FIG. 5 and FIG. 11, along the thickness direction Z of the battery cover 2, a height difference Δh exists between a surface of the battery 71 facing the battery cover 2 and a surface of the battery protection circuit board 72 facing the battery cover 2, so that an accommodating space 99 is formed on the side of the battery protection circuit board 72 facing the battery cover 2. It should be noted that the height difference Δh is a difference between a second distance and a first distance, where the first distance and the second distance are respectively a distance from the surface of the battery 71 facing the battery cover 2 to the inner surface of the battery cover 2 and a distance from the surface of the battery protection circuit board 72 facing the battery cover 2 to the inner surface of the battery cover 2 that are measured along the thickness direction Z of the battery cover 2 by using the inner surface of the battery cover 2 as a reference surface. Exemplarily, the surface of the battery 71 facing the battery cover 2 is closer to the battery cover 2 than the surface of the battery protection circuit board 72 facing the battery cover 2. At least part of the first functional device 9 is accommodated in the accommodating space 99. In this way, a larger first functional device 9 can be arranged on the side of the battery protection circuit board 72 facing the battery cover 2 without increasing an overall thickness of the electronic device 1. Since the accommodating space 99 provides a relatively sufficient mounting space for the first functional device 9, a buffer gap may be provided between the first functional device 9 and the battery protection circuit board 72 in the thickness direction Z of the battery cover 2. When the electronic device 1 falls off or is collided, there is a risk that the first functional device 9 moves toward the battery protection circuit board 72 and thus squeezes or collides with the battery protection circuit board 72. The buffer gap between the first functional device 9 and the battery protection circuit board 72 can accommodate the displacement of the first functional device 9, so that the possibility that the first functional device 9 comes into contact with the battery protection circuit board 72 and thus the first functional device 9 squeezes or collides with the battery protection circuit board 72 is reduced, thereby reducing a possibility of deformation or structural damage of the battery protection circuit board 72 as a result of squeeze or collision of the battery protection circuit board 72 by the first functional device 9. Alternatively, a possibility that a positive tab and a negative tab of the battery 71 are broken or are de-soldered from the protection circuit on the battery protection circuit board 72 as a result of pulling of the tabs by the battery protection circuit board 72 when the first functional device 9 squeezes or collides with the battery protection circuit board 72.

Referring to FIG. 5, the electronic device 1 further includes a main board 5 and an adapter circuit board 11. A plurality of types of electronic elements 6 are arranged on the main board 5. The main board 5 is arranged on a side of the battery protection circuit board 72 facing away from the battery 71. Along the height direction Y of the battery cover 2, the first decorative portion 31 is located on a side of the main board 5 facing the battery 71. Along the thickness direction Z of the battery cover 2, the second decorative portion 32 is arranged corresponding to the main board 5. The second decorative portion 32 is located on a side of the main board 5 facing the battery cover 2. The second decorative portion 32 has a second through hole 3b that is in communication with the hole 21 of the battery cover 2. The second through hole 3b is located in the region defined by the hole 21 of the battery cover 2. The electronic device 1 further includes a second functional device 10. The second functional device 10 is arranged corresponding to the second through hole 3b. The second functional device 10 may be directly connected to the main board 5, so that information exchange can be realized between the second functional device 10 and the main board 5. The adapter circuit board 11 connects the first functional device 9 to the main board 5, so that information exchange can be realized between the first functional device 9 and the main board 5. The adapter circuit board 11 has an extension 111. The extension 111 is located between the battery protection circuit board 72 and the first decorative portion 31. The first functional device 9 is connected to the extension 111. Compared with a manner of directly connecting the first functional device 9 to the main board 5, communicatively connecting the first functional device 9 outside the main board 5 to the main board 5 by the adapter circuit board 11 can reduce design complexity and connection difficulty of the main board 5, thereby facilitating proper internal wiring of the electronic device 1 and improving the space utilization.

Exemplarily, the main board 5 may be a printed circuit board (Printed Circuit Board, PCB), and the adapter circuit board 11 may be the printed circuit board. Pins of the first functional device 9 may be connected to the adapter circuit board 11 by welding, and the adapter circuit board 11 may be connected to corresponding pins of the main board 5 by welding. Alternatively, the main board 5 may be the printed circuit board, and the adapter circuit board 11 may be a flexible printed circuit (Flexible Printed Circuit, FPC). The pins of the first functional device 9 may be connected to the adapter circuit board 11 by welding, and the adapter circuit board 11 may be connected to the main board 5 by board-to-board connectors (Board-to-board Connectors, that is, BTB connectors). Since the flexible printed circuit has a desirable deformation ability, a narrow space may be fully used to complete a wiring layout. Therefore, by using the flexible printed circuit as the adapter circuit board 11, difficulty of connecting the first functional device 9 to the main board 5 can be reduced, and the narrow space in the electronic device 1 can be effectively used, thereby realizing a more proper device layout and a more compact structure in the electronic device 1.

Referring to FIG. 5 and FIG. 11, along the height direction Y of the battery cover 2, the battery 71, the battery protection circuit board 72, and the main board 5 are arranged in a row. Along the height direction Y of the battery cover 2, a first gap H1 exists between the main board 5 and the battery protection circuit board 72. The thickness direction Z of the battery cover 2 is perpendicular to the height direction Y of the battery cover 2. The main board 5 is connected to the middle frame 4. When the electronic device 1 falls off or is collided, there is a risk that the main board 5 moves toward the battery protection circuit board 72 and thus squeezes the battery protection circuit board 72. The first gap H1 between the main board 5 and the battery protection circuit board 72 can accommodate the displacement of the main board 5, so that a possibility that the main board 5 comes into contact with the battery protection circuit board 72 and thus the main board 5 squeezes the battery protection circuit board 72 is reduced, thereby reducing a possibility of deformation or structural damage of the battery protection circuit board 72 as a result of squeeze of the battery protection circuit board 72 by the main board 5.

The electronic device 1 further includes a bracket 12. The bracket 12 is located on the inner side of the battery cover 2. The battery cover 2 may cover the bracket 12. The main board 5 is connected to the bracket 12. For example, the main board 5 may be connected to the bracket 12 by a fastener. The fastener may be a screw or a rivet. The bracket 12 can provide a mounting basis for the main board 5. The bracket 12 includes a support portion 121. The support portion 121 is located between the battery protection circuit board 72 and the first decorative portion 31.

In a possible implementation, the first functional device 9 is connected to the support portion 121. For example, the first functional device 9 is connected to the support portion 121 by bonding. The support portion 121 can provide a support for the first functional device 9, to ensure that the first functional device 9 is stable, thereby further reducing the possibility that the first functional device 9 moves toward the battery protection circuit board 72 and thus squeezes or collides with the battery protection circuit board 72.

In another possible implementation, the first functional device 9 and the extension 111 of the adapter circuit board 11 are both connected to the support portion 121. When the adapter circuit board 11 is the printed circuit board, the extension 111 of the adapter circuit board 11 and the support portion 121 can jointly provide a support for the first functional device 9. Exemplarily, the first functional device 9 and the extension 111 each are connected to the support portion 121 by bonding. When the adapter circuit board 11 is the flexible printed circuit, the support portion 121 can provide a support for the first functional device 9 and the adapter circuit board 11, to ensure that the first functional device 9 and the adapter circuit board 11 are stable, thereby reducing a possibility that the flexible printed circuit is de-soldered or separated from the first functional device 9 or the main board 5 as a result of pulling of the flexible printed circuit by the first functional device 9 during movement.

Exemplarily, the bracket 12 may be detachably connected to the middle frame 4. For example, the bracket 12 is connected to the middle frame 4 by a fastener. The fastener may be a screw.

The first functional device 9 is arranged on a side of the support portion 121 facing the battery cover 2. Along the thickness direction Z of the battery cover 2, the support portion 121 and the first functional device 9 are stacked. Alternatively, the first functional device 9 and the extension 111 are both arranged on the side of the support portion 121 facing the battery cover 2. Exemplarily, along the thickness direction Z of the battery cover 2, the first functional device 9, the extension 111, and the support portion 121 are stacked. Alternatively, the extension 111 is located on a side of the first functional device 9, and along the thickness direction Z of the battery cover 2, the support portion 121 and the first functional device 9 are stacked, and the support portion 121 and the extension 111 are stacked. The support portion 121 can provide a support for the first functional device 9 on a side of the first functional device 9 facing the battery protection circuit board 72, thereby further reducing the possibility that the first functional device 9 moves toward the battery protection circuit board 72.

Referring to FIG. 11, a second gap H2 exists between the support portion 121 of the bracket 12 and the battery protection circuit board 72. The support portion 121 is a cantilever structure and is not in contact with the battery protection circuit board 72. When the electronic device 1 falls off or is collided, there is a risk that the support portion 121 deforms toward the battery protection circuit board 72 and thus squeezes the battery protection circuit board 72. The second gap H2 between the support portion 121 and the battery protection circuit board 72 can accommodate the deformation of the support portion 121, so that the possibility that the support portion 121 comes into contact with the battery protection circuit board 72 and thus the support portion 121 squeezes the battery protection circuit board 72 is reduced, thereby reducing a possibility of deformation or structural damage of the battery protection circuit board 72 as a result of squeeze of the battery protection circuit board 72 by the support portion 121. Alternatively, a possibility that a positive tab and a negative tab of the battery 71 are broken or are de-soldered from the protection circuit on the battery protection circuit board 72 as a result of pulling of the tabs by the battery protection circuit board 72 when the support portion 121 squeezes the battery protection circuit board 72.

Referring to FIG. 5 and FIG. 11, along the height direction Y of the battery cover 2, a third gap H3 exists between the support portion 121 and the battery 71. When the electronic device 1 falls off or is collided, there is a risk that the support portion 121 moves toward the battery 71 and thus squeezes the battery 71. When the battery 71 is squeezed by the support portion 121, there is a risk that a housing of the battery 71 breaks and results in a leakage of an electrolyte. Alternatively, when the battery 71 is squeezed by the support portion 121, there is a risk of a short circuit between the positive tab and the negative tab of the battery 71. The third gap H3 between the support portion 121 and the battery 71 can accommodate the displacement of the support portion 121, so that the possibility that the support portion 121 comes in to contact with the battery 71 and thus the support portion 121 squeezes the battery 71 is reduced, thereby reducing the possibility that the housing of the battery 71 breaks and results in a leakage of the electrolyte as a result of squeeze of the battery 71 by the support portion 121 or the possibility of a short circuit between the positive tab and the negative tab of the battery 71.

A part of the first functional device 9 is located in the first through hole 3*a* and is in clearance fit with the first through hole 3*a*. A part of the first functional device 9 is inserted into the first through hole 3*a*, so that a space of the first through hole 3*a* can be effectively used by the first functional device 9, thereby increasing structural compactness in the thickness direction Z of the battery cover 2 and reducing the thickness of the electronic device 1. A temperature of an environment in which the electronic device 1 is used changes. Therefore, the first functional device 9 or the decorative member 3 may expand or contract with the temperature. The clearance fit between the first functional device 9 and the first through hole 3*a* allows the first functional device 9 to expand or allows the decorative member 3 to contract, thereby reducing a possibility of structural damage or irreversible deformation of the first functional device 9 as a result of bearing a relatively large compressive stress when the first functional device 9 and the first through hole 3*a* are closely attached and result in expansion and contraction.

A part of the second functional device 10 is located in the second through hole 3*b* and is in clearance fit with the second through hole 3*b*. A part of the second functional device 10 is inserted into the second through hole 3b, so that a space of the second through hole 3b can be effectively used by the second functional device 10, thereby increasing the structural compactness in the thickness direction Z of the battery cover 2 and reducing the thickness of the electronic device 1. The temperature of the environment in which the electronic device 1 is used changes. Therefore, the second functional device 10 or the decorative member 3 may expand or contract with the temperature. The clearance fit between the second functional device 10 and the second through hole 3b allows the second functional device 10 to expand or allows the decorative member 3 to contract, thereby reducing a possibility of structural damage or irreversible deformation of the second functional device 10 as a result of bearing a relatively large compressive stress when the second functional device 10 and the second through hole 3b are closely attached and result in expansion and contraction.

In this embodiment of this application, the first functional device 9 is arranged on a side of the battery protection circuit board 72, and the first decorative portion 31 of the decorative member 3 is arranged corresponding to the first functional device 9. In order to avoid positional interference between the first decorative portion 31 and the battery 71, in a possible implementation, the decorative member 3 is arranged on an outer side of the battery cover 2 facing away from the battery module 7, so that there is no positional interference between the first decorative portion 31 and the battery 71. Therefore, it is not necessary to reduce the size of the battery 71 to avoid the first decorative portion 31, thereby avoiding a decrease of the battery life of the electronic device 1 as a result of a reduction of the capacity of the battery 71. In addition, along the height direction Y of the battery cover 2, a part of the decorative member 3 may extend to a position above the battery 71 without affecting the capacity of the battery 71, so that the size of the decorative member 3 can be increased. Since there is no positional interference between the first decorative portion 31 and the battery 71, a larger battery 71 can be arranged in the electronic device 1, thereby increasing the capacity of the battery 71 and prolonging the battery life of the electronic device 1.

Referring to FIG. 11, the size of the decorative member 3 of this application is greater than the size of the hole 21 of the battery cover 2, so that the edge of the decorative member 3 overlaps the battery cover 2. A surface of the battery cover 2 facing the decorative member 3 has a groove 22. The groove 22 extends along a circumferential direction of the hole 21. Exemplarily, the groove 22 extends continuously along the circumference of the hole 21 so as form a circular or rectangular shape. The shape of the groove 22 may be the same as that of the hole 21. The hole 21 is located in a region defined by the groove 22. The electronic device 1 further includes a sealing member 13 arranged in the groove 22. After the decorative member 3 is connected to the battery cover 2, the decorative member 3 covers the groove 22, and the sealing member 13 is in a region where the decorative member 3 and the battery cover 2 overlap each other. The sealing member 13 is configured to seal the battery cover 2 and the decorative member 3, thereby reducing a possibility that external moisture or dust enters the hole 21 through a region where the decorative member 3 and the battery cover 2 are engaged with each other and then enters the electronic device 1 through the hole 21. Exemplarily, the sealing member 13 may be a rubber sealing ring or a silicone sealing ring. Alternatively, glue is dispensed in the groove 22. After the decorative member 3 is bonded to the battery cover 2, the glue is cured to form the sealing member 13.

In some possible implementations, the groove 22 may be arranged on a surface of the decorative member 3 facing the battery cover 2. Alternatively, the groove 22 may be arranged on both the surface of the battery cover 2 facing the decorative member 3 and the surface of the decorative member 3 facing the battery cover 2, and the groove 22 on the battery cover 2 is in communication with the groove 22 on the decorative member 3.

The electronic device 1 further includes a hot-melt connector 14. The decorative member 3 is connected to the battery cover 2 by the hot-melt connector 14. After one end of the hot-melt connector 14 is connected to the decorative member 3, an other end of the hot-melt connector 14 is inserted into a connecting hole 23 of the battery cover 2. The hot-melt connector 14 is heated on the inner side of the battery cover 2 to melt an end portion of the hot-melt connector 14. After the end portion is re-cured, the connection of the decorative member 3 to the battery cover 2 is completed. After the decorative member 3 is connected to the battery cover 2 by the hot-melt connector 14, strength of the connection between the decorative member 3 and the battery cover 2 may be further improved, thereby ensuring stability of the connection between the decorative member 3 and the battery cover 2 and maintaining stable pressing of the decorative member 3 and the battery cover 2 against the sealing member 13. Since the electronic device 1 operates in an environment having a temperature varying greatly, when the decorative member 3 and the battery cover 2 expand or contract with the temperature, slight deformation of the hot-melt connector 14 can buffer a tensile stress or a compressive stress of the decorative member 3 and the battery cover 2, thereby reducing a possibility of separation of the decorative member 3 from the battery cover 2 caused by breaking of the hot-melt connector 14 under the tensile stress or the compressive stress. Exemplarily, the hot-melt connector 14 may be made of a plastic material.

The battery 71 is connected to a surface of the battery cover 2 facing the battery 71. Exemplarily, the battery 71 may be bonded to the battery cover 2. For example, the battery 71 may be bonded to the battery cover 2 by using a thermally conductive adhesive, thereby improving heat dissipation efficiency of the battery 71. Along the height direction Y of the battery cover 2, the battery 71 is located outside the region defined by the hole 21. The battery 71 may extend to a position below the hole 21 without exceeding the surface of the battery cover 2 where the hole 21 is formed. In this way, the battery 71 cannot be observed through the hole 21 when viewed from the outer side of the battery cover 2 along the thickness direction Z of the battery cover 2. Along the thickness direction Z of the battery cover 2, the battery 71 is projected to form a fourth orthographic projection 400. Referring to FIG. 6, along the height direction Y of the battery cover 2, the first decorative portion 31 of the decorative member 3 exceeds an edge of the battery protection circuit board 72 close to the battery 71, so that the second orthographic projection 200 formed by the first decorative portion 31 and the fourth orthographic projection 400 formed by the battery 71 partially overlap. That is to say, the second orthographic projection 200 formed by the first decorative portion 31 and the fourth orthographic projection 400 formed by the battery 71 have an intersection region.

In some possible implementations, the battery 71 is arranged on the middle frame 4 and has a gap with the battery cover 2. The gap may be configured for a device such as the flexible printed circuit to be arranged.

The decorative member 3 in this embodiment of this application is exemplarily shown as a rectangle and is located in a middle of an upper half of the electronic device 1. In other possible implementations, the shape of the decorative member 3 may be a circle or a polygon having more than four sides. The decorative member 3 may be located in a left region or a right region of the upper half of the electronic device 1. Alternatively, the decorative member 3 occupies 70% to 90% of the region of the upper half.

One or more than two first functional devices 9 may be arranged on the side of the battery protection circuit board 72 facing the battery cover 2 in this embodiment of this application. This is not limited herein.

In this application, it should be noted that, unless otherwise explicitly specified and defined, terms such as "mounted", "connected", and "connection" should be understood in broad sense, for example, the connection may be a fixed connection, an indirect connection through an intermediary, or internal communication between two elements or a mutual action relationship between two elements. A person of ordinary skill in the art may understand the specific meanings of the foregoing terms in the embodiments of this application according to specific situations.

In the embodiments of this application, orientation or location relationships do not indicate or imply that an apparatus or element in question needs to have a particular orientation, or needs to be constructed and operated in a particular orientation, and therefore cannot be construed as a limitation on the embodiments of this application. In the description of the embodiments of this application, unless otherwise accurately specifically specified, "a plurality of" means two or more than two.

The terms such as "first", "second", "third", and "fourth" (if any) in the specification and claims of the embodiments of this application and in the accompanying drawings are used for distinguishing similar objects and not necessarily used for describing any particular order or sequence. It should be understood that data used in this way is interchangeable in a suitable case, so that the embodiments of the embodiments of this application described herein can be implemented in a sequence in addition to the sequence shown or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

The term "a plurality of" in this specification refers to two or more than two. The term "and/or" used herein describes only an association relationship for describing associated objects and represents that three relationships may exist. For example, A and/or B may represent the following three cases: Only A exists, both A and B exist, and only B exists. In addition, the character "/" in this specification generally indicates that the relationship between the associated objects is "OR". In a formula, the character "/" indicates that the relationship between the associated objects is "division".

Understandably, various reference numerals in the embodiments of this application are merely for differentiation for ease of description, and are not intended to limit the scope of the embodiments of this application.

It may be understood that in the embodiments of this application, an order of sequence numbers of the foregoing processes does not indicate an execution sequence, and execution sequences of the processes should be determined according to functions and internal logics thereof and should not impose any limitation on an implementation process of the embodiments of this application.

What is claimed is:

1. An electronic device, comprising:
    a battery cover with a hole;
    a battery module arranged on an inner side of the battery cover and comprising a battery and a battery protection circuit board connected to the battery, wherein the battery protection circuit board is arranged facing the hole, and along a thickness direction of the battery cover, the battery protection circuit board is projected to form a first orthographic projection;
    a decorative member arranged on the battery cover and comprising a first decorative portion and a second decorative portion, wherein along the thickness direction of the battery cover, the first decorative portion is projected to form a second orthographic projection, the first orthographic projection and the second orthographic projection at least partially overlap, the first decorative portion has a first through hole that is in communication with the hole, the second decorative portion is located on a side of the battery protection circuit board away from the battery, and the second decorative portion has a second through hole that is in communication with the hole; and
    a first functional device located on a side of the battery protection circuit board facing the first decorative portion and arranged corresponding to the first through hole, wherein along the thickness direction, the first functional device is projected to form a third orthographic projection, and the first orthographic projection and the third orthographic projection at least partially overlap.

2. The electronic device of claim 1, wherein an edge of the first orthographic projection close to the battery and an edge of the third orthographic projection close to the battery have a coincident region.

3. The electronic device of claim 1, wherein an edge of the first orthographic projection close to the battery is tangent to an edge of the third orthographic projection close to the battery.

4. The electronic device of claim 1, wherein the third orthographic projection is located within the first orthographic projection.

5. The electronic device of claim 1, wherein along the thickness direction, a height difference exists between a surface of the battery facing the battery cover and a surface of the battery protection circuit board facing the battery cover, an accommodating space is formed on a side of the battery protection circuit board facing the battery cover, and at least part of the first functional device is accommodated in the accommodating space.

6. The electronic device of claim 1, wherein the decorative member is arranged on an outer side of the battery cover facing away from the battery module.

7. The electronic device of claim 6, wherein a surface of the battery cover facing the decorative member has a groove, the groove extends along a circumferential direction of the hole; and
    wherein the electronic device further comprises a sealing member arranged in the groove, and the sealing member is configured to seal the battery cover and the decorative member.

8. The electronic device of claim 7, further comprising a hot-melt connector;
   wherein the decorative member is connected to the battery cover by the hot-melt connector.

9. The electronic device of claim 6, wherein along a height direction of the battery cover, the battery is located outside a region defined by the hole, and along the thickness direction, the battery is projected to form a fourth orthographic projection; and
   wherein the second orthographic projection and the fourth orthographic projection partially overlap, and the thickness direction is perpendicular to the height direction.

10. The electronic device of claim 1, further comprising a main board and an adapter circuit board;
    wherein the main board is arranged on a side of the battery protection circuit board facing away from the battery;
    wherein along the thickness direction, the second decorative portion is arranged corresponding to the main board; and
    wherein the adapter circuit board is connected to the first functional device and the main board, the adapter circuit board has an extension, the extension is located between the battery protection circuit board and the first decorative portion, and the first functional device is connected to the extension.

11. The electronic device of claim 10, wherein along the height direction of the battery cover, a first gap exists between the main board and the battery protection circuit board, and the thickness direction is perpendicular to the height direction.

12. The electronic device of claim 10, further comprising a bracket;
    wherein the bracket is located on an inner side of the battery cover, the main board is connected to the bracket, the bracket comprises a support portion, the support portion is located between the battery protection circuit board and the first decorative portion, and the first functional device is connected to the support portion.

13. The electronic device of claim 10, further comprising a bracket;
    wherein the bracket is located on an inner side of the battery cover, the main board is connected to the bracket, the bracket comprises a support portion, the support portion is located between the battery protection circuit board and the first decorative portion, and the first functional device and the extension are both connected to the support portion.

14. The electronic device of claim 13, wherein the first functional device is arranged on a side of the support portion facing the battery cover, or the first functional device and the extension are both arranged on a side of the support portion facing the battery cover.

15. The electronic device of claim 12, wherein along the thickness direction, a second gap exists between the support portion and the battery protection circuit board.

16. The electronic device of claim 12, wherein along the height direction of the battery cover, a third gap exists between the support portion and the battery, and the thickness direction is perpendicular to the height direction.

17. The electronic device of claim 11, further comprising a second functional device;
    wherein the second functional device is located on a side of the main board facing the second decorative portion, and is arranged corresponding to the second through hole.

18. The electronic device of claim 1, wherein a part of the first functional device is located in the first through hole and is in clearance fit with the first through hole.

19. The electronic device of claim 1, wherein the first functional device is a camera module, a flash, a time-of-flight sensor, a light sensor, a microphone, or a display.

20. An electronic device, comprising:
    a battery cover with a hole;
    a battery module comprising a battery and a battery protection circuit board connected to the battery, wherein the battery protection circuit board is arranged facing the hole, and along a thickness direction of the battery cover, the battery protection circuit board is projected to form a first orthographic projection;
    a decorative member comprising a first decorative portion and a second decorative portion, wherein along the thickness direction of the battery cover, the first decorative portion is projected to form a second orthographic projection, the first orthographic projection and the second orthographic projection at least partially overlap, the first decorative portion has a first through hole being in communication with the hole, the second decorative portion is located on a side of the battery protection circuit board away from the battery, and the second decorative portion has a second through hole being in communication with the hole; and
    a first functional device located on a side of the battery protection circuit board facing the first decorative portion, wherein the first functional device is arranged corresponding to the first through hole; wherein along the thickness direction, the first functional device is projected to form a third orthographic projection, and the first orthographic projection and the third orthographic projection at least partially overlap.

* * * * *